United States Patent

Akamatsu et al.

Patent Number: 5,709,741
Date of Patent: Jan. 20, 1998

[54] WATER REPELLENT FOR APPLICATION TO GLASS AND WATER-REPELLENT GLASS

[75] Inventors: Shoji Akamatsu, Chiba Prefecture; Toshiyuki Okada, Kanagawa Prefecture, both of Japan

[73] Assignee: Dow Corning Toray Silicone Co., Ltd., Tokyo, Japan

[21] Appl. No.: 605,604

[22] Filed: Feb. 22, 1996

[30] Foreign Application Priority Data

Feb. 28, 1995 [JP] Japan .................. 7-065148

[51] Int. Cl.$^6$ ..................................... C09D 183/16
[52] U.S. Cl. ..................................... 106/287.11
[58] Field of Search ............................. 106/287.11

[56] References Cited

U.S. PATENT DOCUMENTS

| 4,184,880 | 1/1980 | Huber et al. | 106/287.11 |
| 4,212,925 | 7/1980 | Kratel et al. | 428/447 |
| 5,431,852 | 7/1995 | Kaijou | 106/287.11 |

FOREIGN PATENT DOCUMENTS

| 142958 | 8/1983 | Japan . |
| 172246 | 10/1983 | Japan . |
| 247914 | 10/1990 | Japan . |

OTHER PUBLICATIONS

CA 90:123256 Osipchik et al, "Composition for a water resistant coating", Dec. 1978.
CA 123:270746 Nishihara et al, "Hydrophobic silica powder . . . ", Jul. 1995.

Primary Examiner—David Brunsman
Attorney, Agent, or Firm—Richard I. Gearheart

[57] ABSTRACT

A water repellent for application to glass, comprising disilazane with the general formula

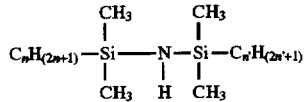

in which n and n' are the same or different integers having values from 2 to 20, and water-repellent glass whose surface has been treated with said water repellent.

4 Claims, No Drawings

WATER REPELLENT FOR APPLICATION TO GLASS AND WATER-REPELLENT GLASS

FIELD OF THE INVENTION

This invention relates to a water repellent for application to glass (hereinafter called a glass-grade water repellent) and to water-repellent glass. More particularly, this invention relates to a glass-grade water repellent that exhibits an excellent water repellence and that is particularly well suited for the production of glass whose surface improves the flow of water drops that have come to rest on the glass surface. This invention also relates to water-repellent glass whose surface has been treated with said water repellent.

DESCRIPTION OF THE PRIOR ART

Glass-grade water repellents are already known in the form of treatment agents based on alkyl-substituted trichlorosilane (e.g., methyltrichlorosilane, ethyltrichlorosilane, or octyltrichlorosilane), perfluoroalkyl-substituted trichlorosilane, or hexamethyldisilazane (refer to Japanese Patent Application Laid Open [Kokai or Unexamined] Numbers Sho 58-142958 [142,958/1983], Sho 58-172246 [172,246/1983], and Hei 2-247914 [247,914/1990]). The trichlorosilane-based water repellents are very reactive with the hydroxyl groups on the surface of glass and therefore offer the advantage of good treatment efficiencies. However, they suffer from the disadvantages of poor storage stability and poor processability because they are quite susceptible to conversion to low-reactivity silanol or unreactive siloxane through their reaction with atmospheric moisture during storage and during handling in open systems. In addition to these disadvantages, the hydrochloric acid produced during treatment of the glass surface is corrosive to metals, which precludes application to glass that will adjoin metal, for example, automotive glass panes. Glasses whose surface has been treated with a trichlorosilane-based water repellent invariably exhibit a contact angle versus water of at least 105° and thus an excellent water repellence. However, water drops residing on such surfaces do not readily flow or drain off. In particular, when a spray of water drops attaches to such a surface, a large number of water drops may attach in a particular area and fail to flow off, causing obstruction of the field of vision for a lengthy period of time. The hexamethyldisilazane-based water repellents are encumbered by the high volatility of hexamethyldisilazane itself. When this type of water repellent is spread out on the glass surface, the hexamethyldisilazane volatilizes before it can react with the surface hydroxyl groups, which prevents a thorough development of the agent's activity. In addition, glass treated with hexamethyldisilazane-based water repellents also suffers from the same problem of field-of-vision obstruction because water drops attaching on such surfaces are again resistant to flow.

In specific terms, then, the present invention takes as an object the introduction of a glass-grade water repellent that is highly processable and is able to yield glass free of vision obstructions because water drops residing on the glass surface readily flow or run off. An additional object of the present invention is the introduction of water-repellent glass whose surface has been treated with the subject water repellent.

DETAILED DESCRIPTION OF THE INVENTION

The present invention relates to a water repellent for application to glass, comprising disilazane with the general formula

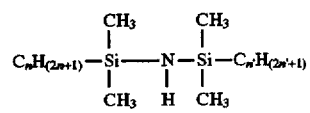

in which n and n' are the same or different integers having values from 2 to 20. The invention also relates to water-repellent glass whose surface has been treated with the subject water repellent.

The glass-grade water repellent according to the present invention characteristically comprises disilazane with the general formula given above. The subscripts n and n' in this formula, which may be the same or may differ, are integers from 2 to 20 and preferably from 4 to 15. The groups $-C_nH_{(2n+1)}$ and $-C_{n'}H_{(2n'+1)}$ are exemplified by ethyl, propyl, butyl, pentyl, hexyl, octyl, decyl, dodecyl, and octadecyl. This group may have either a straight-chain or branched-chain structure, but straight-chain structures are preferred. This disilazane is exemplified by compounds with the following formulas.

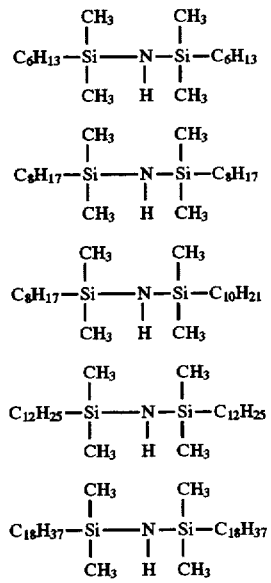

This disilazane can be synthesized, for example, by bubbling ammonia (equivalency=3× on a molar basis) through the chlorosilane prepared by the platinum-catalyzed addition reaction between dimethylchlorosilane and the straight-chain alpha-olefin $C_nH_{2n}$ and/or $C_{n'}H_{2n'}$ (n and n' are integers from 2 to 20). The ammonium chloride by-product is then removed followed by distillation or elimination of unreacted starting materials.

While the glass-grade water repellent according to the present invention comprises the above-described disilazane, it may contain components added on an optional basis for the purpose of improving its durability and wipe-off characteristics. These optional components are exemplified by powders, such as those of silica, calcium carbonate, magnesium oxide, and so forth, and by low-boiling organic solvents, such as toluene, xylene, and so forth. In the case of organic solvent addition, the resulting disilazane concentration is preferably at least 1 percent by weight and particularly preferably from 5 to 50 of the total composition.

Techniques for treating glass surfaces with the glass-grade water repellent according to the present invention are exemplified by the following: application of the water repellent from paper or cloth impregnated with the water repellent; use of a sprayer to spray a mist of the water repellent according to the present invention; and immersion of the glass in water repellent according to the present invention. The surface of the glass that will receive this treatment is preferably preliminary cleaned with organic solvent or detergent. After the water repellent according to the present invention has been coated on the glass surface by one of these techniques, the treatment is completed by wiping off the excess agent with a dry paper, cloth, etc., and/or by heating.

The glass-grade water repellent according to the present invention as described above is relatively stable to atmospheric moisture and therefore exhibits an excellent processability and storage stability. In addition, since ammonia is the by-product evolved during treatment of the glass surface, the water repellent according to the present invention will not corrode metals and can therefore be applied to glass adjacent to metal, for example, automotive glass panes.

The characteristic feature of water-repellent glass according to the present invention is that its surface has been treated with the above-described water repellent. Suitable glass substrates are, for example, glass panes in the transportation sector, such as in vehicles like automobiles and railroad cars, as well as in aircraft and ships; architectural glass panes; automotive side mirrors; glass for lighting fixtures; glass plate; mirrors; glass containers; glass instruments and appliances; lenses for eyewear; and lenses for optical components. Preferred among these are architectural glass panes and glass panes in the transportation sector.

Water-repellent glass according to the present invention exhibits little difference between its advancing and receding contact angles versus water. As a result, water drops attached on its surface flow much more readily than for glass whose surface has been treated with prior-art glass-grade water repellents. Water-repellent glass according to the present invention is therefore highly qualified for application as glass panes where good visibility is a critical issue.

EXAMPLES

This invention will now be explained in additional detail through working examples. In order to evaluate the ease of flow by water drops residing on the glass surface, the following methods were used to determine the angle of glass inclination at which a water drop would undergo spontaneous flow and the advancing and receding angles of contact by the glass versus water.

Angle of Inclination at the Point of Spontaneous Water Drop Flow

A water drop (40 microliters) was placed on the glass after treatment of its surface with the glass-grade water repellent, and this sample was placed on a tiltable plate. The angle of inclination of the tiltable plate was then gradually increased, and the angle of inclination was measured at the point at which the water drop began to shift.

Advancing and Receding Contact Angles Versus Water

These values were measured by the sessile drop technique (liquid drop method). After surface treatment with the glass-grade water repellent, the glass sheet was installed in a contact angle meter maintained on the horizontal. 20 microliters distilled water was gently dripped onto this surface using a microsyringe. While maintaining contact between the water drop and the microsyringe, small quantities of distilled water were added to the water drop, and the contact angle was measured just before the contact area between the water drop and glass surface increased. This was designated as the advancing contact angle. In addition, after dripping 20 microliters distilled water onto the glass sheet as above, small amounts of distilled water were withdrawn from the water drop using the microsyringe. In this case, the contact angle was measured just before the water drop/glass surface contact area decreased. This was designated as the receding contact angle.

Reference Example 1

123 g (1.1 mol) 1-octene and 100 microliters of a 2% toluene solution of chloroplatinic acid were placed in a 500-mL four-neck flask equipped with a stirrer, thermometer, addition funnel, and condenser and were heated to 70° C. After the temperature had been raised, the heating mantle was removed and 94.5 g (1 mol) dimethylchlorosilane was added dropwise from the addition funnel. Heat generation was observed immediately, and the dropwise addition was carried out gradually so as to avoid having the temperature of the reaction solution exceed 80° C. After the completion of this addition, the reaction was continued for 30 minutes at 80° C. Gas chromatographic analysis of the resulting reaction solution gave 88% octyldimethylchlorosilane. The reaction solution was cooled to room temperature and 200 g toluene was introduced. The addition funnel was then replaced with a Teflon tube and ammonia was bubbled in until the pH of the reaction solution reached 10. The ammonium chloride product was removed by filtration, and the filtrate was then distillatively purified at 160° C./0.5 mmHg to obtain the following disilazane in a purity of 98 weight %.

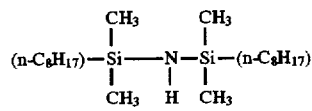

Reference Example 2

185 g (1.1 mol) 1-dodecene and 100 microliters of a 2% toluene solution of chloroplatinic acid were placed in a 500-mL four-neck flask equipped with a stirrer, thermometer, addition funnel, and condenser and were heated to 70° C. After the temperature had been raised, the heating mantle was removed and 94.5 g (1 mol) dimethylchlorosilane was added dropwise from the addition funnel. Heat generation was observed immediately, and the dropwise addition was carried out gradually so as to avoid having the temperature of the reaction solution exceed 80° C. After the completion of this addition, the reaction was continued for 30 minutes at 80° C. Gas chromatographic analysis of the resulting reaction solution detected 85% dodecyldimethylchlorosilane. The reaction solution was then distilled at 140° C./5 mmHg to yield dodecyldimethylchlorosilane with a purity of 99%. 150 g toluene was introduced into 190 g of the obtained dodecyldimethylchlorosilane. The addition funnel was then replaced with a Teflon tube and ammonia was bubbled in until the pH of the reaction solution reached 10. The ammonium chloride product was removed by filtration, and the unreacted starting material in the filtrate was removed at 150° C./1 mmHg to obtain the following disilazane in a purity of 95 weight %.

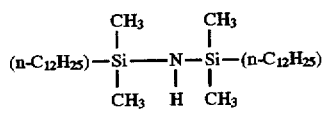

EXAMPLE 1

The surfaces of glass slides were respectively treated with the disilazanes synthesized in Reference Examples 1 and 2. In each case, the surface of a commercially available glass microscope slide (brand name: Microslide Glass, from Matsunami Kabushiki Kaisha) was first cleaned with acetone and dried; 5 drops of the particular disilazane was dripped onto the surface using an eyedropper and spread out with a cloth; and the uniformly wetted glass surface was held at room temperature for 5 minutes. After this period of standing, the surface was thoroughly wiped off with a dry cloth to the point that no oil film remained on the surface. The glass surface thus treated was then submitted to the measurements described above (angle of inclination at the point of spontaneous water drop flow and advancing and receding contact angles versus water), and these results are reported in Table 1.

COMPARATIVE EXAMPLE 1

The surfaces of glass sides were respectively treated as in Example 1 with octyltrichlorosilane, perfluoro-n-hexylethyltrichlorosilane, or hexamethyldisilazane. The resulting glass samples were submitted to the measurements described above (angle of inclination at the point of spontaneous water drop flow and advancing and receding contact angles versus water), and these results are reported in Table 1.

TABLE 1

|  | angle of inclination (°) | advancing contact angle (°) | receding contact angle (°) |
|---|---|---|---|
| Example 1 |  |  |  |
| 1,1,3,3-tetramethyl-1,3-dioctyldisilazane | 13 | 97 | 86 |
| 1,1,3,3-tetramethyl-1,3-didodecyldisilazane | 13 | 97 | 86 |
| Comparative Example 1 |  |  |  |
| octyltrichlorosilane | 18 | 105 | 90 |
| perfluoro-n-hexylethyl-trichlorosilane | 31 | 124 | 90 |
| hexamethyldisilazane | 28 | 60 | * |
| untreated glass | 20 | 24 | * |

*Measurement could not be carried out due to lack of water drop movement.

EXAMPLE 2

Each of the disilazanes (2 g) synthesized in Reference Examples 1 and 2 was placed, respectively, in a 30-mL sample bottle with a bottom surface area of about 3 cm². The sample bottle was allowed to stand undisturbed in a room for 1 hour with the lid open. After this period of standing, 5 drops of the particular disilazane was dripped using an eyedropper onto the surface of a commercially available glass microscope slide (brand name: Microslide Glass, from Matsunami Kabushiki Kaisha) that had been preliminary cleaned with acetone and dried. The disilazane was spread out with a cloth, and the uniformly wetted glass surface was held at room temperature for 5 minutes. After this period of standing, the surface was thoroughly wiped off with a dry cloth to the point that no oil film remained on the surface. The glass surface thus treated was then submitted to the measurements described above (angle of inclination at the point of spontaneous water drop flow and advancing and receding contact angles versus water), and these results are reported in Table 2. The results confirmed that the glass-grade water repellents according to the present invention exercised a substantial activity even after standing in an open system, thereby also confirming their excellent processability.

COMPARATIVE EXAMPLE 2

Octyltrichlorosilane, perfluoro-n-hexylethyltrichlorosilane, and hexamethyldisilazane were each subjected to a holding period as in Example 2 and were each then used to treat glass slide surfaces. The glass surfaces thus treated were then submitted to the measurements described above (angle of inclination at the point of spontaneous water drop flow and advancing and receding contact angles versus water), and these results are reported in Table 2.

TABLE 2

|  | angle of inclination (°) | advancing contact angle (°) | receding contact angle (°) |
|---|---|---|---|
| Example 2 |  |  |  |
| 1,1,3,3-tetramethyl-1,3-dioctyldisilazane | 15 | 95 | 84 |
| 1,1,3,3-tetramethyl 1,3-didodecyldisilazane | 14 | 96 | 85 |
| Comparative Example 2 |  |  |  |
| octyltrichlorosilane | 25 | 101 | 84 |
| perfluoro-n-hexylethyl-trichlorosilane | 35 | 118 | 75 |
| hexamethyldisilazane | 28 | 59 | * |

*Measurement could not be carried out due to lack of water drop movement.

EXAMPLE 3

A cloth was impregnated with the disilazane synthesized in Reference Example 1, and this was used to apply the disilazane to only the driver's side of the windshield of an automobile. The windshield had been preliminarily cleaned with a surfactant-containing glass detergent. After application of the disilazane, the windshield was wiped dry with a dry cloth. When this car was driven at 40 km/hour on a rainy day, it was observed that the raindrops attaching on the driver's side of the windshield readily flowed under the effects of the vibration and wind pressure generated during running. Good vision was obtained even without using the wipers. In contrast, the windshield on the passenger's side, which had not been treated with the disilazane, suffered from a poor visibility that would have hampered driving without the use of the wipers.

EXAMPLE 4

A cloth was impregnated with the disilazane synthesized in Reference Example 1, and this was used to apply the disilazane to the glass pane on a building. The glass pane had been preliminarily cleaned with a surfactant-containing glass detergent. After application of the disilazane, the pane was wiped dry with a dry cloth. It was observed that raindrops readily flowed downward on this surface-treated glass pane, which as a result provided a better visibility even on rainy days than a pane whose surface had not been treated with the disilazane.

I claim:

1. A composition comprising a disilazane having the formula:

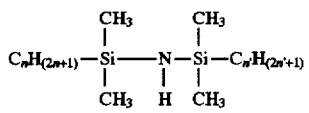

in which n and n' are the same or different integers having values from 2 to 20, wherein said composition includes at least one of silica, calcium carbonate, or magnesium oxide, and said disilazane is present in an amount from 5 to 50 percent by weight of the total composition.

2. The composition of claim 1, wherein n and n' are the same or different integers having values from 4 to 15.

3. The composition of claim 1, wherein n and n' are the same or different integers having values of 6, 8, 12 or 18.

4. The composition of claim 1 further including an organic solvent.

* * * * *